(12) United States Patent
Kondo

(10) Patent No.: US 7,385,387 B2
(45) Date of Patent: Jun. 10, 2008

(54) SIGNAL PROCESSING CIRCUIT OF ROTATION DETECTING DEVICE

(75) Inventor: Kenji Kondo, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/640,875

(22) Filed: Dec. 19, 2006

(65) Prior Publication Data

US 2007/0139036 A1 Jun. 21, 2007

(30) Foreign Application Priority Data

Dec. 20, 2005 (JP) .............................. 2005-366973

(51) Int. Cl.
G01P 3/48 (2006.01)
G01P 3/487 (2006.01)
G01P 3/486 (2006.01)
G01P 3/36 (2006.01)

(52) U.S. Cl. ...................... 324/166; 324/173; 324/175

(58) Field of Classification Search ................ 324/165, 324/166, 167, 173, 174, 175, 178, 179, 207.25; 73/514.39; 356/617; 340/441, 870, 3, 870.33
See application file for complete search history.

(56) References Cited

U.S. PATENT DOCUMENTS

| | | | | |
|---|---|---|---|---|
| 3,942,112 A | * | 3/1976 | Westbrook | ................... 324/166 |
| 5,500,585 A | * | 3/1996 | Aab | ............................ 324/165 |
| 6,282,954 B1 | * | 9/2001 | Ott et al. | ...................... 73/488 |
| 6,492,804 B2 | * | 12/2002 | Tsuge et al. | ................. 324/166 |
| 6,559,634 B2 | * | 5/2003 | Yamada | ....................... 324/174 |
| 6,747,553 B2 | * | 6/2004 | Yamada et al. | ............. 340/441 |
| 6,844,723 B2 | * | 1/2005 | Shirai et al. | ........... 324/207.25 |

FOREIGN PATENT DOCUMENTS

| | | |
|---|---|---|
| JP | A-53-020982 | 2/1978 |
| JP | A-01-219672 | 9/1989 |
| JP | A-10-332725 | 12/1998 |
| JP | A-2000-187039 | 7/2000 |

* cited by examiner

Primary Examiner—Reena Aurora
Assistant Examiner—Kenneth J Whittington
(74) Attorney, Agent, or Firm—Posz Law Group, PLC

(57) ABSTRACT

A rotation detecting device includes a rotation detecting unit for providing first and second rotation signals in response to rotation of a rotating object and a signal processing circuit for processing the signals to provide rotation data such as the rotation direction, rotation speed and rotation position. The signal processing circuit includes a reversal signal forming circuit for providing a reversal signal changing in response to a change of the rotation direction, a level-change-prohibiting section for forming a level-change prohibiting signal to mask the first rotation signal during one pulse width from the first rising edge to the first falling edge after the change of the rotation direction of the rotor is detected, and a rotation data processing circuit for forming from the reversal signal and the level-change prohibiting signal a signal having triple-level pulses that synchronize with the pulses of the first rotation signal except for first one of the pulses being masked after each change of the rotation direction and change voltage level when the rotation direction changes.

10 Claims, 5 Drawing Sheets

| OUT1 | Rev | Tr1 | Tr2 | OUT2 |
|------|-----|-----|-----|------|
| 0 | 0 | OFF | OFF | H |
| 1 | 0 | ON | OFF | L |
| 0 | 1 | OFF | OFF | H |
| 1 | 1 | OFF | ON | M |

SIGNAL PROCESSING CIRCUIT OF ROTATION DETECTING DEVICE

CROSS REFERENCE TO RELATED APPLICATION

The present application is based on and claims priority from Japanese Patent Application 2005-366973, filed Dec. 20, 2005, the contents of which are incorporated herein by reference.

BACKGROUND OF THE INVENTION

1. Field of the Invention

The present invention relates to a signal processing circuit of a rotation detecting device that obtains data about rotation of a rotating object, such as the rotation position, the rotation speed and/or the rotation direction of the rotating object.

2. Description of the Related Art

As shown in FIG. 6, a common rotation detection device includes a pair of magnetic sensors 1, 2, a magnetic rotor 80 that rotates with a rotating object and a signal processing circuit 100. The magnetic rotor 80 has a plurality of teeth having mountains 80*a* and valleys 80*b*. The processing circuit 100 is constituted of a rotation data forming section 101, a rotation direction detecting section 102 and a masking section 103. When the magnetic rotor 80 rotates, the magnetic sensors 1, 2 provide rotation signals Sa and Sb, which are inputted to the processing circuit 100. Thus, the data about the rotation of the rotating object are obtained.

As shown in FIG. 7, the rotation data forming section 101 provides a rectangular signal whose level changes in synchronism with the rising edge of the rotation signal Sa or Sb when the magnetic rotor 80 rotates in a normal direction. When the rotation direction of the rotating object changes from one direction to the other direction, the rotation direction detecting section 102 detects the change of the direction by change in the phase-relationship between the rotation signals Sa and Sb. Then, the masking section 103 masks the first edge after the change of the rotation direction to obtain an output signal OUT1 that has the same pulse width or duty ratio as the rotation signal Sa, as long as the duty ratio is about 50% or higher.

However, if the duty ratio of the rotation signals Sa, Sb is as low as about 25% as shown in portion (a) of FIG. 8, the output signal OUT1 after the masking may be reversed as shown in portion (b) of FIG. 9, resulting in that the output signal OUT1 has an entirely different duty ratio. If, for example, the rotation detecting device is set to an engine, the position of the crankshaft of an engine can not be accurately detected.

SUMMARY OF THE INVENTION

Therefore, an object of the invention is to provide an improved signal processing circuit with a rotation detecting device.

Another object of the invention is to provide a rotation detecting device that can detect accurate rotation data that include the duty ratio of a rotation signal.

According to a feature of the invention, a signal processing circuit a rotation detecting device includes a reversal signal forming means for providing a bi-level reversal signal (Rev) changing from one level to another in response to a change of rotation direction of a rotor, a level-change-prohibiting section for forming a level-change prohibiting signal (Ce) to mask a first rotation signal (Sa) during one pulse width from the first rising edge to the first falling edge after the change of the rotation direction of the rotor is detected and a rotation data processing means for forming a triple level output signal (OUT2) having triple-level pulses that synchronize with the pulses of the first rotation signal (Sa) except for first one of the pulses being masked after each change of the rotation direction and change voltage level from one level to another when the rotation direction changes one direction to the other direction.

In the above signal processing circuit, the rotation sensing unit preferably includes a first rotation sensors for providing the first rotation signal (Sa) and a second rotation sensor for providing a bi-level second rotation signal (Sb) in response to rotation of the rotor at a phase different from the first rotation signal. In this case, the reversal signal forming means includes a reversal signal detecting section for detecting a change of rotation direction by a change in phase of the first rotation signal (Sa) relative to the second rotation signal (Sb). The reversal signal forming means further includes a reversal signal forming section for providing a bi-level reversal signal (Rev) according to direction of rotation of the rotor.

In addition, the rotation data processing means may include an edge detecting section for detecting edges of the first rotation signal (Sa), a first output signal forming section for forming a bi-level first output signal (OUT1) having pulses that synchronize with the pulses of the first rotation signal (Sa) except for one pulse being masked right after each change of the rotation direction and a rotation data processing section for forming the triple level second output signal (OUT2) based on the first bi-level output signal (OUT1) and the reversal signal (Rev).

A rotation detecting device having the above signal processing circuit may include as the rotor a magnetic disk having teeth on the periphery thereof and as the first and/or second rotation sensors a magnetic sensor disposed opposite the magnetic disk. Such a rotation detecting device may include a rotary disk having a plurality of slits on the periphery thereof as the rotor; and a light emitting diode and a photo transistor disposed opposite said rotary disk.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A signal processing circuit of a rotation detecting device according to a preferred embodiment of the present invention will be described with reference to the appended drawings.

Figure 1:
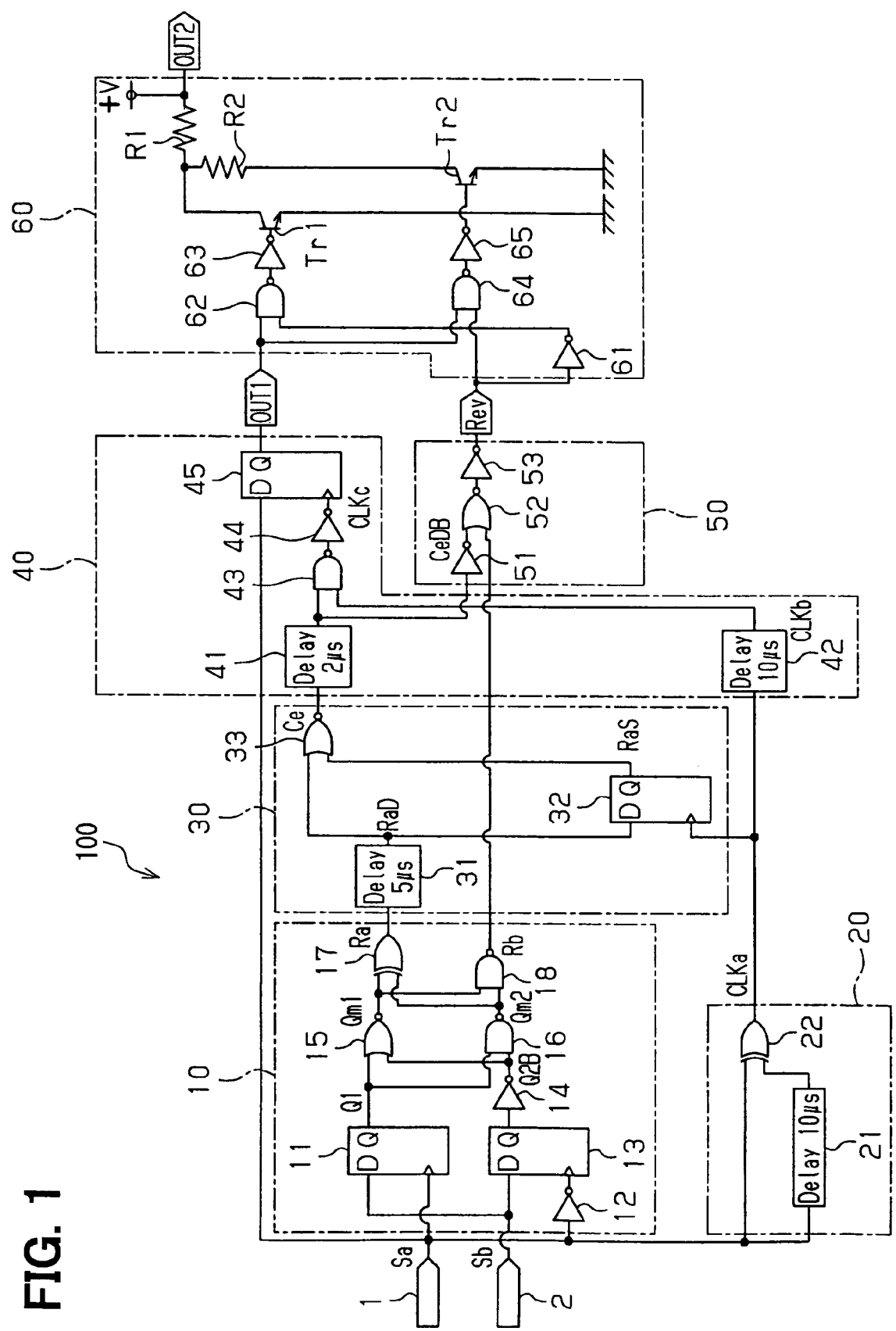
FIG. 1 is a circuit diagram of a signal processing circuit of a rotation detecting device according to a preferred embodiment of the invention.

As shown in FIG. 1, the signal processing circuit 100 is constituted of a reversal detecting section 10 connected to a first magnetic sensor 1 and a second magnetic sensor 2, an edge detecting section 20, a level-change-prohibiting section 30, an output signal forming section 40, a reversal signal forming section 50 and a rotation data processing section 60.

The reversal detecting circuit 10 includes a pair of D-flip-flop circuits 11 and 13, an inverter 14 connected to a Q-terminal of the second D-flip-flop circuit 13, a NOR circuit 15, a NAND circuit 16, an exclusive (Ex) OR circuit 17, a NAND circuit 18, etc.

The reversal detecting section 10 detects a reversal of the rotor 80 by a change in the phase of the first rotation signal Sa relative to the second rotation signal Sb. The edge detecting section 20 detects all the edges of the first rotation signal Sa. The level-change-prohibiting section 30 provides a level-change prohibiting signal Ce to prohibit the level change of the signal inputted thereto in synchronism with the first rising edge and the first falling edge of the first rotation signal Sa after detection of the reversal by the reversal detecting section 10. The output signal forming section 40 masks the first pulse of the signal inputted thereto after detection of the reversal according to the level-change-prohibiting signal Ce to provide a signal OUT1 that includes information of the reversal of the rotor 80.

The above operation of the signal processing circuit will be described in more detail with reference to FIGS. 1 and 2.

Figure 2:
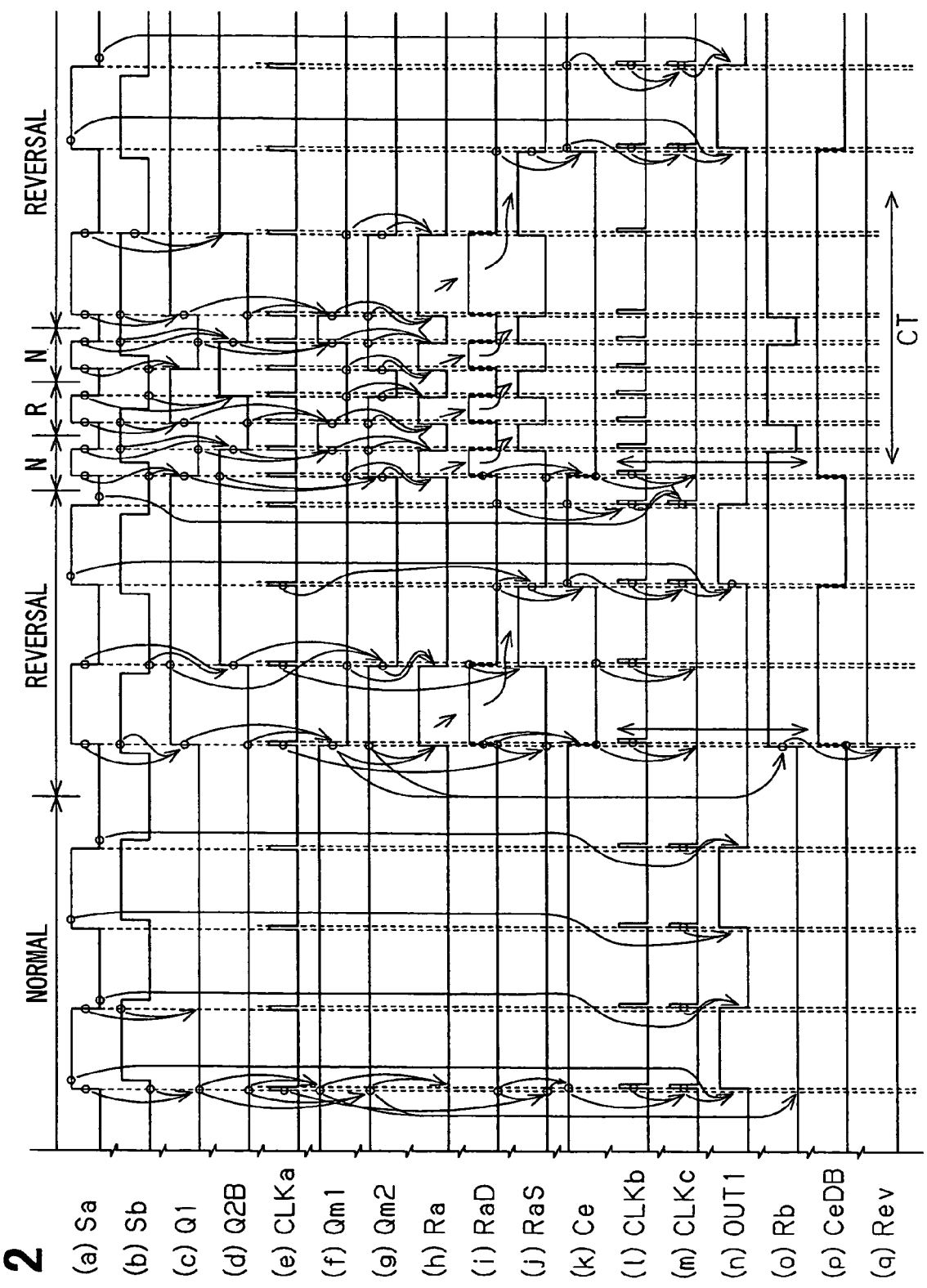
FIG. 2 is a time chart showing signals at various portions of the signal processing circuit of the rotation detecting device according to the preferred embodiment.

The first rotation signal Sa is inputted from the first magnetic sensor 1 to a clock terminal of the first D-flip-flop circuit 11 of the reversal detecting section 10 and to a clock terminal of the second D-flip-flop circuit 13 thereof via an inverter 12, and the second rotation signal Sb is also inputted from the second magnetic sensor 2 to D-terminals of the first and second D-flip-flop circuits 11, 13, as shown in (a) and (b) of the time chart shown in FIG. 2.

The first D-flip-flop circuit 13 provides output signal Q1, as shown in (c), in which the preceding rising edge of the first rotation signal latches the logical level of the second rotation signal Sb in the normal rotation. That is, level "0" is maintained at the normal rotation, and level "1" is maintained at the reversed rotation.

The second D-flip-flop circuit 13 provides via the inverter 14 a second output signal Q2B, as shown in (d), in which the preceding falling edge of the first rotation signal Sa latches the logical level of the second rotation signal Sb in the normal rotation. That is, level "0" is maintained at the normal rotation, and level "1" is maintained at the reversed rotation. However, the level change of the second output signal Q2B is retarded by one pulse of the first rotation signal Sa from the level change of the first output signal Q.

Figure 8:
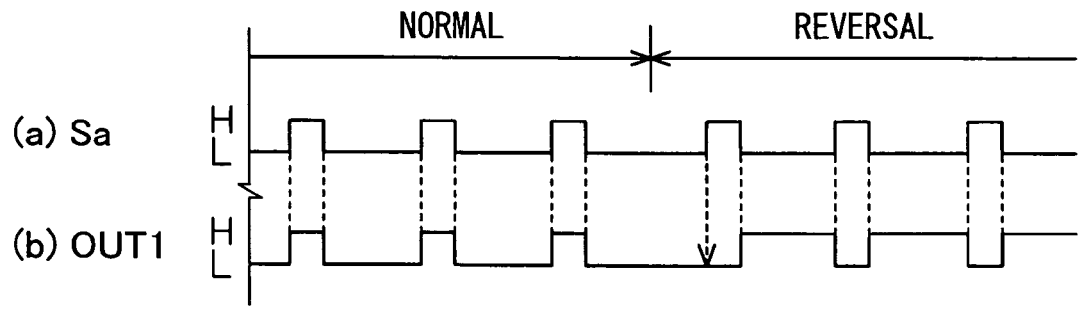
FIG. 8 is a time chart showing a relationship between a rotation signal having a lower duty ratio and the output signal of the prior art signal processing circuit.

Signals Qm1, Qm2 shown in (f) and (g) are respectively the output signals of the NOR circuit 15 and the NAND circuit 16. The Ex OR circuit 17 has input terminals respectively connected to the output terminals of the NOR circuit 15 and the NAND circuit 16 and provides a reversal detection signal Ra as shown in (h) of FIG. 2. The reversal detection signal Ra rises up when the first rotation signal Sa rises up right after the reversal of the rotor 80 shown in FIG. 8 and falls down just when the first rotation signal Sa first falls down.

The signals Qm1, Qm2 are sent to the NAND circuit 18 to form an output signal Rb, as shown in (o) of FIG. 2. The signal Rb rises up just when the first rotation signal Sa rises up after the rotation direction of the rotor 80 changes from a normal direction to the reversed direction and falls down after the rotation direction of the rotor 80 changes from the reversed direction to the normal direction.

The edge detecting section 20 includes a delay circuit 21 connected with the first magnetic sensor 1 and an exclusive (Ex) OR circuit 22 has input terminals respectively connected with the first magnetic sensor 1 and the delay circuit 21.

The delay circuit 21 delays the first rotation signal Sa by about 10 microseconds, and the Ex OR circuit 22 provides a clock signal CLKa having the pulse width of 10 microseconds, as shown in (e) of FIG. 2. This clock signal CLKa synchronizes with all the rising and falling edges of the first rotation signal Sa.

The level-change-prohibiting section 30 includes a delay circuit 31, a D-flip-flop circuit 32 and a NOR circuit 33 that has a pair of input terminals respectively connected with the delay circuit 31 and the Q terminal of the D-flip-flop circuit 32.

The delay circuit 31 delays the reversal detection signal Ra by about 5 microseconds to provide a delay signal RaD as shown in (i). The D-flip-flop circuit 32 has a D-terminal connected with the delay circuit 31 and a clock terminal connected to the Ex OR circuit 22 to latch the delay signal RaD in synchronism with the rising edge of the clock signal CLKa, thereby providing a latch signal RaS that delays from the reversal detection signal Ra by one pulse thereof, as shown in (j) of FIG. 2. The NOR circuit 33 provides "0" level of the level-change prohibiting signal Ce while the level of the delay signal RaD or the latch signal RaS is "1", as shown in (k) of FIG. 2.

The output signal forming section 40 includes delay circuits 41, 42, a NAND circuit 43, an inverter 44 and a D-flip flop circuit 45. The output signal forming section 40 provides an output signal OUT1 whose pulses synchronize with the pulses of the first rotation signal Sa except for one pulse being masked right after each change of the rotation direction is detected.

The delay circuit 41 is constituted of about ten (10) series-connected inverters to delay the signal Ce by about 2 microseconds and filter the signal Ce to remove a steepled wave voltage of it. The delay circuit 42 is constituted of about twenty (20) series-connected inverters to delay the clock signal CLKa by about 10 microseconds to form a clock signal CLKb, as shown in (1) of FIG. 2. A series circuit of the NAND circuit 43 and the inverter 44 forms a clock signal CLKc, as shown in (m) of FIG. 2, which is inputted to a clock terminal of the D-flip-flop circuit 45 to provide the signal OUT1, as shown in (n) of FIG. 2. The signal OUT1 has "1" level signals that synchronize with the pulses of the first rotation signal Sa except for one pulse being masked right after the change of the rotation direction is detected.

Incidentally, the clock signal CLKc does not appear as long as the level of the level-change prohibiting signal Ce is "0". The level-change prohibiting signal Ce also prohibits the clock signal CLKc while the rotation direction of the rotor 80 frequently changes in a chattering operation, as indicated by CT in FIG. 2. Accordingly, generation of abnormal pulses can be prevented.

The reversal signal forming section 50 includes an inverter 51, a NOR circuit 52 and an inverter 53. The reversal signal forming section 50 provides a reversal signal Rev.

The inverter 51 provides the inverted signal CeDB of the output signal of the Delay circuit 41, as shown in (p) of FIG. 2. The NOR circuit 52 has input terminals respectively connected to the inverter 51 and the NAND circuit 18. The series circuit of the NOR circuit 52 and the inverter 53 forms the reversal signal Rev, which is shown in (q) of FIG. 2. When the rotor 80 rotates in the normal direction, the level of the reversal signal is "0", while the level of the reversal signal is "1" when it rotates in the other direction.

The rotation data processing section 60 includes inverters 61, 63, 65, NAND circuits 62, 64, resistors R1, R2, transistors Tr1, Tr2 and a DC power source connected to an end of the resistor R1. The rotation data processing section 60 provides a triple level signal OUT2 whose level changes as the rotation direction of the rotor 80 changes.

Figures 3, 4:
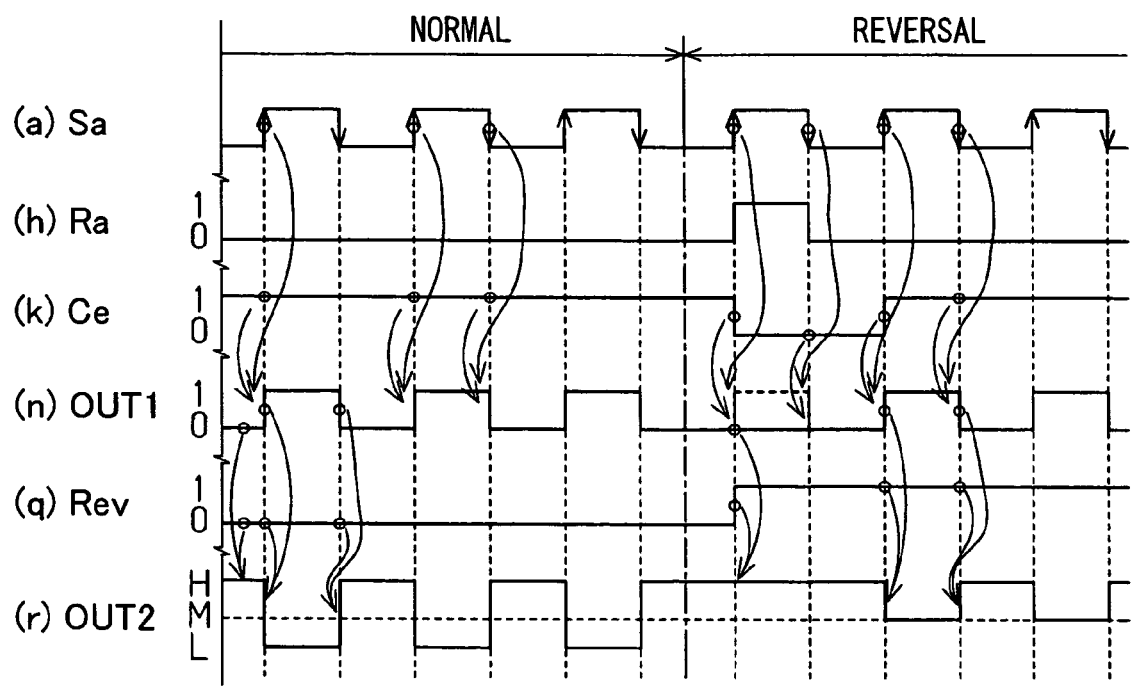
FIG. 3 is a table showing operating conditions of main portions of the signal processing circuit of the rotation detecting device according to the preferred embodiment.
FIG. 4 is a time chart showing at main portions of the signal processing circuit.
Figure 5:
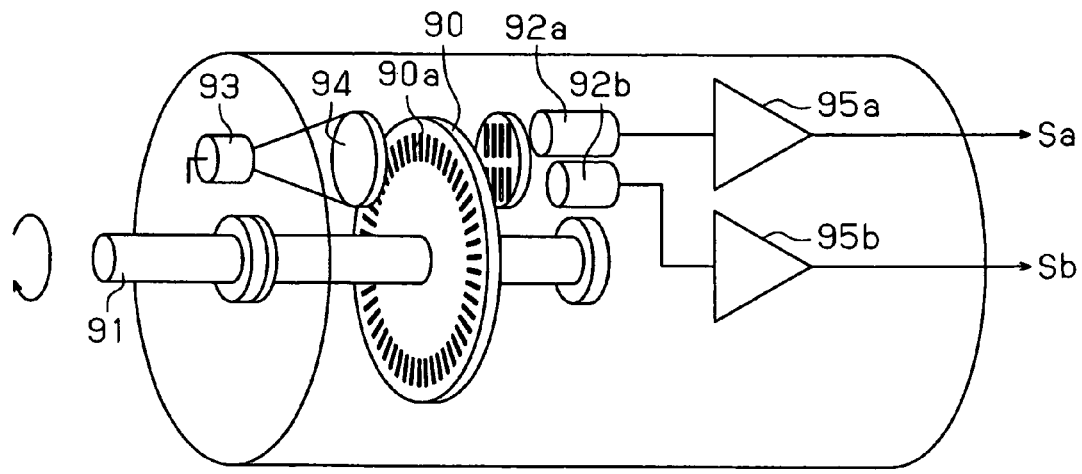
FIG. 5 is a schematic diagram showing a main portion of the rotation detecting device of the rotation detecting device according to the preferred embodiment.

The NAND circuit 62 has input terminals respectively connected to the D-flip-flop circuit 45 and the inverter 53 via the inverter 61, and the NAND circuit 64 has input terminals respectively connected to the D-flip-flop circuit 45 and the inverter 53. The NAND circuit 62 controls the transistor Tr1 via the inverter 63, and the NAND circuit 64 controls the transistor Tr2 via the inverter 65. Therefore, the transistors Tr1, Tr2 turn on or off to provide the signal OUT2, which is shown in FIGS. 3 and 4. The signal OUT2 has three levels, that is, H (high level), L (low level) and M (middle level).

When the rotor 80 rotates in the normal direction, the level of the reversal signal Rev is "0", as shown in (q) of FIG. 2 or 4. In the meantime, the level of the output signal OUT2 of the rotation data processing section 60 becomes "H" as long as the level of the signal OUT1 is "0", and the level of the output signal OUT2 becomes "L" as long as the level of the signal OUT1 is "1", as shown in (n), (q), (r) of FIG. 4. When, on the other hand, the rotor 80 rotates in the reversed direction, the level of the reversal signal Rev is "1". In the meantime, the level of the output signal OUT2 of the rotation data processing section 60 becomes "H" as long as the level of the signal OUT1 is "0", and the level of the output signal OUT2 becomes "M" as long as the level of the signal OUT1 is "1". Thus, the output signal OUT2 changes its level when the rotation of the rotor 80 changes from one direction to the other.

Even if the duty ratio of the rotation signal Sa becomes as low as 25%, the output signals OUT1, OUT2 provide the same duty ratio or logical level transition as the rotation signal Sa.

Figure 6:
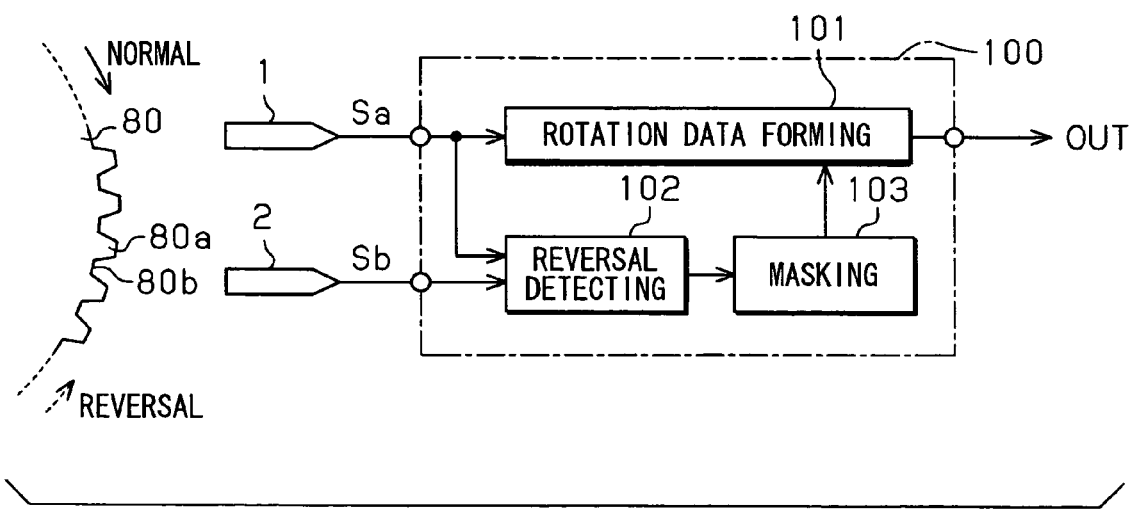
FIG. 6 is a block diagram showing a prior art signal processing circuit.
Figure 7:
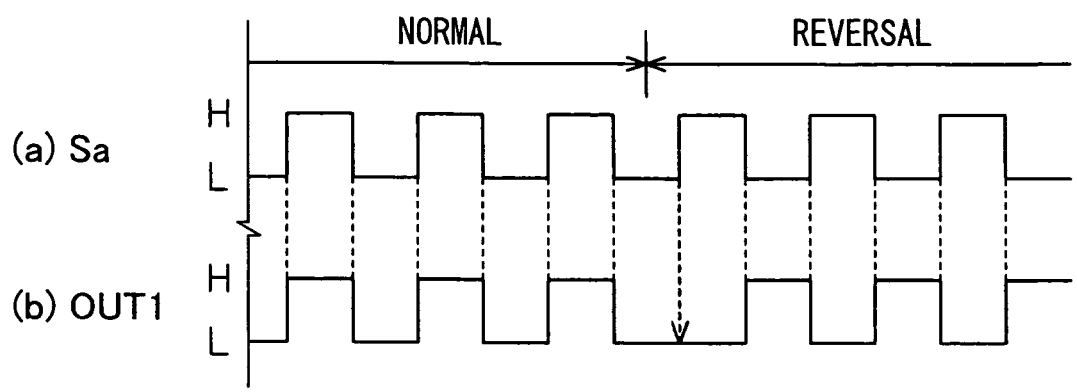
FIG. 7 is a time chart showing a relationship between a rotation signal having a higher duty ratio and the output signal of the prior art signal processing circuit.

The arrangement of magnetic rotor 80 and the magnetic sensors 1, 2 shown in FIG. 6 may be replaced by an optical rotary encoder. The rotary encoder includes a rotary disk 90 having a plurality of slits 90a, a shaft 91, a pair of phototransistors 92a, 92b disposed at one side of the rotary disk 90, a light emitting diode 93 with a magnifying glass 94 and amplifiers 95a, 95b.

When a light is emitted from the light emitting diode 93, the light is magnified by the magnifying glass 94. The magnified light passes through the slits 90a and received by the phototransistors 92a, 92b, which convert the light into electric signals. The amplifiers 95a, 95b amplify the electric signals to form the rotation signals Sa and Sb, which are different in phase from each other. These signals are inputted to the reversal detecting section 10 to obtain the output signal OUT1 and/or the output signal OUT2 in the same manner as described above.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A signal processing circuit of a rotation detecting device that includes a rotor rotatable with a rotating object, a rotation sensing unit for providing a bi-level first rotation signal (Sa) in response to rotation of the rotor, said signal processing circuit comprising:
   a reversal signal forming means, connected to said rotation sensing unit, for providing a bi-level reversal signal (Rev) changing from one level to the other in response to a change of rotation direction of the rotor;
   a level-change-prohibiting section, connected to said reversal signal forming means, for forming a level-change prohibiting signal (Ce) to mask the first rotation signal (Sa) during one pulse width from the first rising edge to the first falling edge after the change of the rotation direction of the rotor is detected; and
   a rotation data processing means, connected with said level change prohibiting section and said reversal signal forming means, for forming a triple level output signal (OUT2) having triple-level pulses that synchronize with the pulses of the first rotation signal (Sa) except for first one of the pulses being masked after each change of the rotation direction and change voltage level from one level to another when the rotation direction changes one direction to the other direction.

2. A signal processing circuit as in claim 1, wherein:
   said rotation sensing unit comprises a first rotation sensors for providing the first rotation signal (Sa) and a second rotation sensor for providing a bi-level second rotation signal (Sb) in response to rotation of the rotor at a phase different from the first rotation signal,
   said reversal signal forming means comprises a reversal signal detecting section for detecting a change of rotation direction by a change in phase of the first rotation signal (Sa) relative to the second rotation signal (Sb).

3. A signal processing circuit as in claim 2, wherein said reversal signal forming means further comprises a reversal signal forming section, connected to said reversal signal detecting section, for providing a bi-level reversal signal (Rev) according to direction of rotation of the rotor.

4. A signal processing circuit as in claim 3, wherein said rotation data processing means comprises an edge detecting section for detecting edges of the first rotation signal (Sa), a first output signal forming section for forming a bi-level first output signal (OUT1) having pulses that synchronize with the pulses of the first rotation signal (Sa) except for one pulse being masked right after each change of the rotation direction and a rotation data processing section, connected with said output signal forming section and said reversal signal forming section, for forming the triple level second output signal (OUT2) based on the first bi-level output signal (OUT1) and the reversal signal (Rev).

5. A rotation detecting device having the signal processing circuit as claimed in claim 1, wherein:
   said rotor comprises a magnetic disk having teeth on the periphery thereof; and said rotation sensing unit comprises a magnetic sensor disposed opposite said magnetic disk.

6. A rotation detecting device having the signal processing circuit as claimed in claim 1, wherein:

said rotor comprises a rotary disk having a plurality of slits on the periphery thereof; and said rotation sensing unit comprises a light emitting diode and a photo transistor disposed opposite said rotary disk.

7. A signal processing circuit of a rotation detecting device that includes a rotation detecting unit for providing first and second bi-level rotation signals (Sa, Sb) in response to rotation of a rotating object, said signal processing circuit comprising:

a reversal signal forming means for providing a bi-level reversal signal (Rev) changing from one level to the other in response to a change of rotation direction of the rotating object;

a level-change-prohibiting section for forming a level-change prohibiting signal (Ce) to mask the first rotation signal (Sa) during one pulse width from the first rising edge to the first falling edge after the change of the rotation direction of the rotor is detected; and a rotation data processing means for forming from the bi-level reversal signal (Rev) and the level-change prohibiting signal (Ce) a triple level output signal (OUT2) having triple-level pulses that synchronize with the pulses of the first rotation signal (Sa) except for first one of the pulses being masked after each change of the rotation direction and change voltage level from one level to another when the rotation direction changes one direction to the other direction.

8. A signal processing circuit as in claim 7, wherein said reversal signal forming means comprises a reversal signal detecting section for forming a rotation-direction signal (Rb) whose level changes when the rotation direction of the rotating object changes.

9. A signal processing circuit as in claim 8, said reversal signal forming means further comprises a reversal signal forming section for forming a bi-level reversal signal (Rev) from the rotation-direction signal (Rb) and the level-change prohibiting signal (Ce).

10. A signal processing circuit as in claim 9, wherein said rotation data processing means comprises an edge detecting section for detecting edges of the first rotation signal (Sa), a first output signal forming section for forming a bi-level first output signal (OUT1) having pulses that synchronize with the pulses of the first rotation signal (Sa) except for one pulse being masked right after each change of the rotation direction and a rotation data processing section for forming the triple level second output signal (OUT2) from the first bi-level output signal (OUT1) and the reversal signal (Rev).

* * * * *